Figure 2:
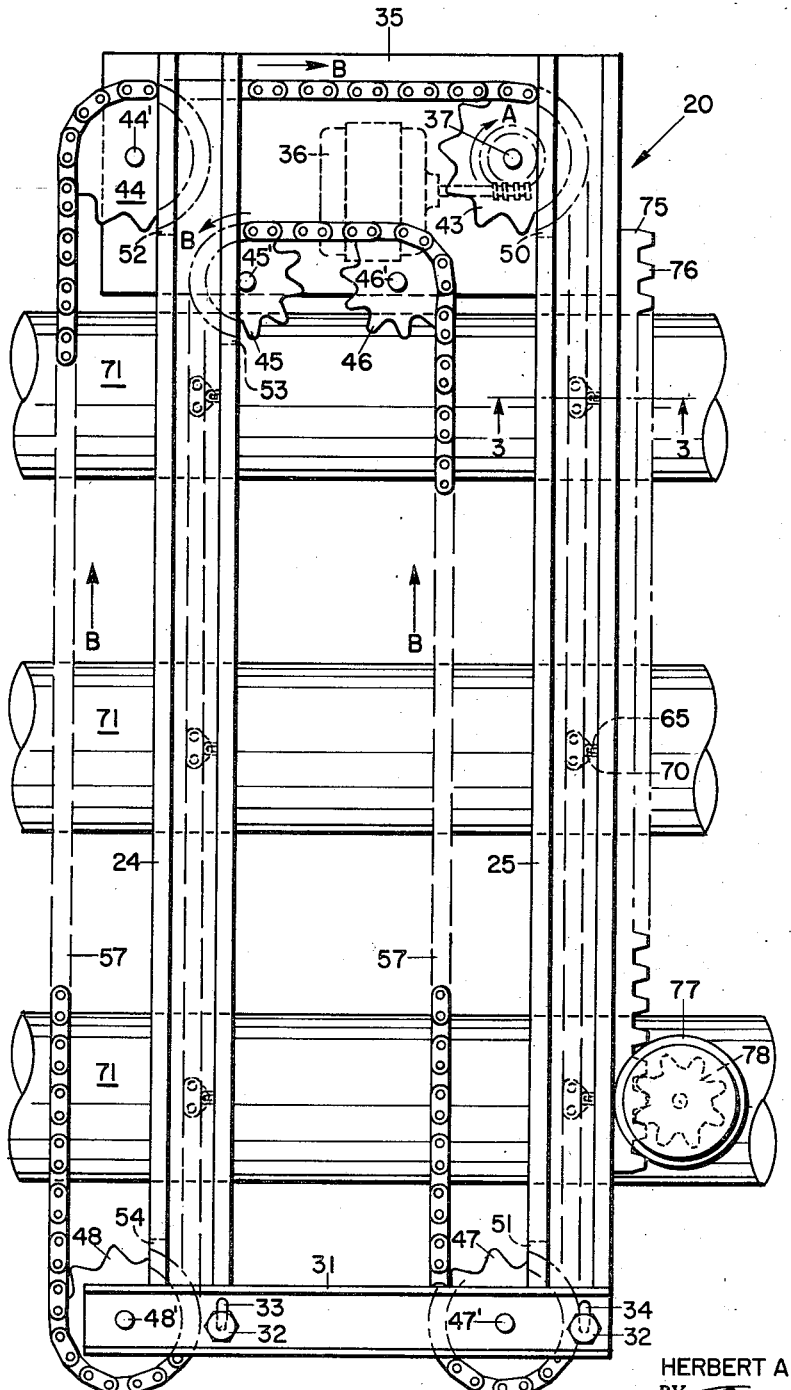

June 10, 1958   H. A. HELSTROM, JR   2,837,970
MISSILE LAUNCHER DEVICE
Filed Dec. 17, 1953   2 Sheets-Sheet 1
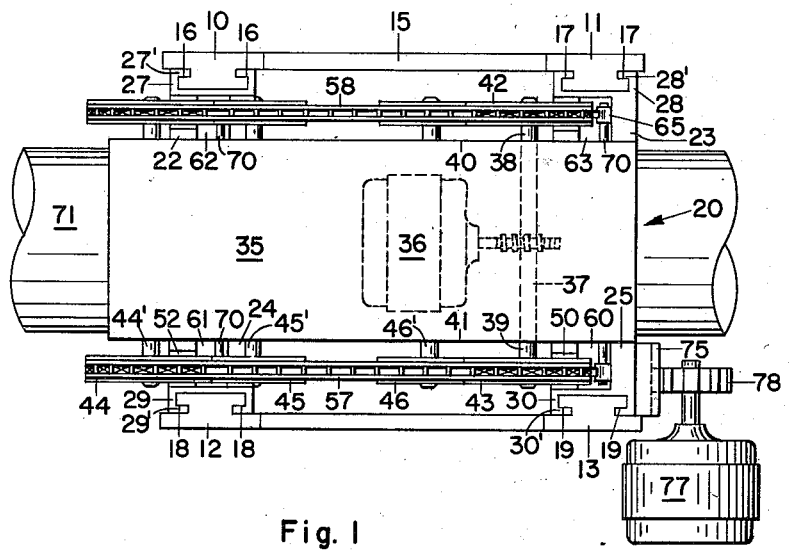
Fig. 1
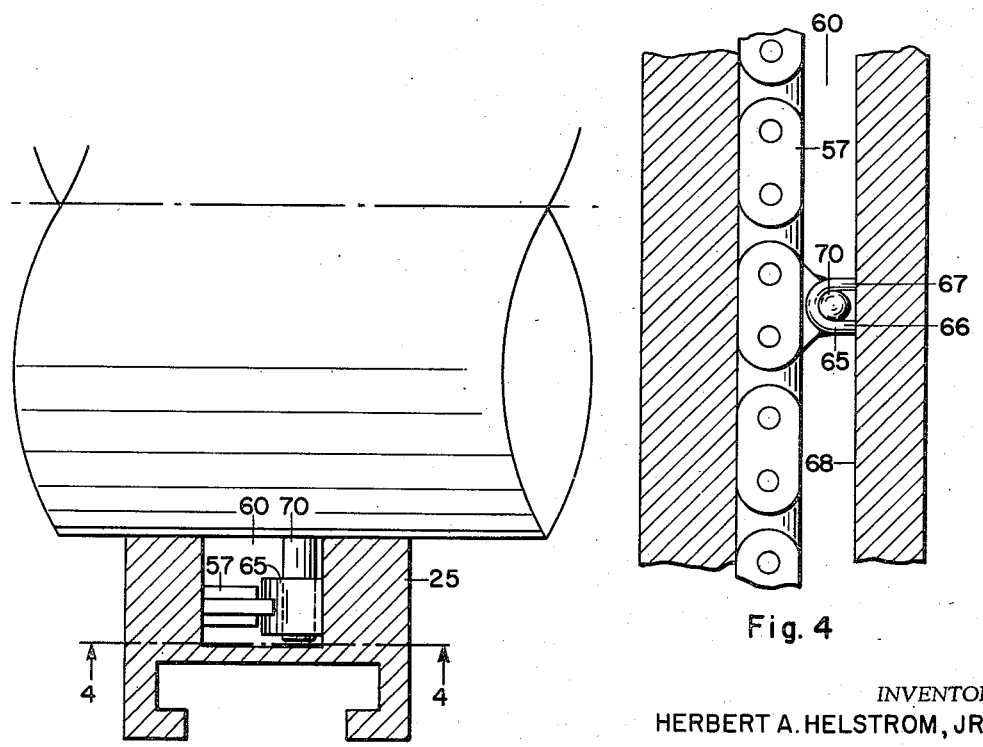
Fig. 3
Fig. 4
INVENTOR
HERBERT A. HELSTROM, JR.
BY
ATTORNEYS June 10, 1958     H. A. HELSTROM, JR     2,837,970
MISSILE LAUNCHER DEVICE Filed Dec. 17, 1953     2 Sheets-Sheet 2

INVENTOR.
HERBERT A. HELSTROM, JR.
BY
ATTORNEYS

United States Patent Office 2,837,970
Patented June 10, 1958

2,837,970

MISSILE LAUNCHER DEVICE

Herbert A. Helstrom, Jr., Dallas, Tex., assignor, by mesne assignments, to Chance Vought Aircraft, Incorporated, a corporation of Delaware Application December 17, 1953, Serial No. 398,703

2 Claims. (Cl. 89—1.7)

The present invention relates to a missile launcher device and more particularly to a device adapted to launch guided missiles from aircraft.

In missile launching devices utilized in aircraft, it is desirable that the device and the associated missiles may be housed within the body of the aircraft and selectively extended into firing position during flight. Consequently, the streamlined outer contour of the aircraft is not interrupted by launching apparatus mounted on the exterior thereof. Such devices are desirably light and simple in construction, yet sturdy and reliable in operation, and should permit the launching of a plurality of missiles in rapid succession by remotely controlled means.

Accordingly, the present invention comprises a plurality of guide members which are mounted in an armament bay located in the fuselage of an aircraft, the means for mounting these guide members being of any suitable type known in the art. A supporting frame is slidably mounted upon the guide members and means is provided for selectively raising and lowering the supporting frame relative to the associated fixed guide members whereby the frame may be extended during flight. A bank of missiles is positioned within the frame and means is provided for moving the missiles relative to the frame such that the missiles may be successively disposed in firing position. Suitable remote control means is provided for firing the missiles in a predetermined position and sequence.

An object of the present invention is the provision of a new and novel missile launcher device which is adapted to be housed within the body of an aircraft and which may be selectively extended into firing position during flight.

Another object is to provide a missile launcher device which will permit the launching of a plurality of missiles in rapid succession by remotely controlled means.

A further object of the invention is the provision of a missile launcher device which is light and simple in construction, yet sturdy and reliable in operation.

Other objects and many of the attendant advantages of this invention will be readily appreciated as the same becomes better understood by reference to the following detailed description when considered in connection with the accompanying drawing wherein:

Fig. 1 shows somewhat diagrammatically a top view of a preferred embodiment of the invention, Fig. 2 is a side view of the device shown in Fig. 1 with certain members removed for clarity, Fig. 3 is an enlarged sectional view taken on line 3—3 of Fig. 2, and Fig. 4 is a view taken on line 4—4 of Fig. 3.

It should be noted that the invention device is adapted to be mounted within any suitable armament bay in an aircraft and although but one such device is shown for the purpose of illustration, a plurality thereof may be employed if desired, provided that the various devices are operated in proper timed sequence relative to one another.

Doors may be provided for the armament bay in a well-known manner whereby the bay is normally enclosed during flight, and the doors may be opened to permit extension of certain components of the device beyond the body of the aircraft to place the missiles in position for firing.

Referring now to the drawings, wherein like reference characters designate like or corresponding parts throughout the several views, there is shown in Fig. 1 a plurality of vertically extending guide members 10—13 which are parallel to one another and are suitably secured to fixed members within the armament bay. Guide members 10—13 have horizontally extending stiffener members 15 mounted therebetween as by welding or the like and grooves 16—19 are formed in opposite lateral portions of members 10—13 respectively.

A supporting frame indicated generally by reference numeral 20 comprises four vertically extending members 22—25 having respectively formed integral therewith and coextensive with the length thereof vertically extending flanges 27—30, the end portions 27'—30' of which are slidably mounted within the grooves 16—19 respectively whereby members 22—25 are guided in their vertical movement by members 16—19.

Fig. 2 is a side view of the device as shown in Fig. 1 with the guide members removed and it may be seen that a horizontally extending member 31 is connected between adjacent end portions of members 24 and 25 by means of bolts 32 which pass through vertically extending slots 33 and 34 formed in member 31 and suitable holes formed in members 24 and 25 respectively. A member similar to member 31 is connected in a like manner between the corresponding adjacent end portions of members 22 and 23.

As may be more clearly seen in Fig. 1, an enclosed housing 35 is supported between the opposite adjacent end portions of members 22—25 by means of welding or the like and a conventional reversible hydraulic motor 36 is mounted therein. Motor 36 is suitably geared to a shaft 37 the opposite end portions 38 and 39 of which are journaled in and extend through the opposite lateral walls 40 and 41 respectively of the housing, a sprocket 42 being fixed on end portion 38 and a sprocket 43 being fixed on end portion 39.

Referring to Fig. 2, a sprocket 44 is rotatably mounted on a stud 44' fixed to housing 35 such that sprocket 44 is in the same horizontal plane as sprocket 43, and sprockets 45, 46 are rotatably mounted respectively on studs 45' and 46' fixed to housing 35 such that sprockets 45 and 46 are in a horizontal plane below that of sprockets 43 and 44. Sprockets 47 and 48 are rotatably mounted on studs 47' and 48' suitably secured to member 31 such that sprockets 47 and 48 are in vertical alignment with sprockets 43 and 44 respectively. Sprockets 43 and 47 are respectively received within vertically extending cutout portions 50 and 51 formed in member 25 and sprockets 44, 45, 48 are respectively received within vertically extending cutout portions 52, 53, 54 formed in member 24. An endless chain 57 is mounted on sprockets 43—48 in the manner shown whereby upon actuation of motor 36 in a manner to drive shaft 37 in the direction of arrow A, the chain will travel about the sprockets in the direction of arrows B. Similar sprockets and an endless chain 58 are mounted in a like manner on the corresponding components on the opposite side of the housing as viewed in Fig. 2. It is apparent that by loosening bolts 32 and adjusting the position of member 31 relative to members 24 and 25, sprockets 47 and 48 will be moved relative to the sprockets 43—46 such that any slack existing in the chain may be eliminated.

Referring to Figs. 1 and 3, it may be seen that a portion of chain 57 is disposed within and is adapted to travel through a channel 60 which extends vertically throughout the length of member 25. Similar channels 61, 62 and 63 are formed in members 24, 22 and 23 respectively and portions of the associated chains are disposed therein in a similar manner.

As seen most clearly in Fig. 4, a substantially U-shaped, open-ended retaining member 65 is secured to the chain as by welding or the like, and the end portions 66 and 67 of the retaining member are in engagement with the wall 68 of channel 60. A cylindrical lug 70 is shown as being seated within the retaining member, lug 70 being formed integral with the body of a missile which is supported by the device, and it is evident that other configurations may be employed for members 65 and 70. Each of the missiles has four such lugs, two being longitudinally spaced on one side thereof and two similar lugs being longitudinally spaced at diametrically opposite positions thereon. As seen in Fig. 2, chain 57 has a plurality of retaining members 65 secured thereto at spaced intervals such that missiles 71 may be supported in proper spaced relationship by means of the associated lugs 70. The missiles are supported in a like manner at diametrically opposite portions thereof by similar lugs on chain 58 which are horizontally aligned with the corresponding lugs on chain 57. While the missiles have been shown as three in number, it is apparent that any number of missiles may be supported by the device as limited by the dimensions of the missiles, and the number and spacing of retaining members 65 will be determined by the desired interval between firing of the missiles.

It is evident that as chains 57 and 58 are driven in the direction of arrows B in Fig. 2, the missiles will be lowered within the supporting frame 20 and the missiles will be successively released from the frame as the end portions of the associated retaining members become disengaged from the walls of the respective channels and begin to travel about the lower sprockets, thereby releasing the missile lugs such that gravity will cause the missiles to fall away from the device.

Referring to Fig. 2, member 25 has a rack member 75 secured thereto as by welding or the like, a plurality of rack teeth 76 being formed along the lateral portion thereof, and it is apparent that the rack teeth may be formed integral with member 25 if desired, thereby eliminating member 75. A conventional reversible hydraulic motor 77 is suitably secured to a fixed member within the armament bay and drives a pinion 78 which meshes with teeth 76 on member 75 whereby the motor is adapted to raise and lower frame 20 with respect to the fixed guide members 10—13.

When the missiles are in stowed position as shown in Figs. 1 and 2, control information and data may be injected into the missiles by utilizing the normal electronic receiving channels of the missiles. Information may be formulated by the missile auxiliaries within the aircraft and transmitted at radio frequencies to the armament bay by conventional means, and in this manner the missiles may be continuously remotely controlled without any interruption during the launching operation.

Suitable means (not shown) is provided for remotely controlling the actuation of motors 36 and 77, and the speed of the motors and sequence of operation thereof is automatically controlled in accordance with the desired time interval between launching of the missiles. The missiles may be connected to a power supply within the aircraft when in stowed position and conventional quick disconnect means may be provided for disconnecting the missiles during the launching operation.

Operation of the device is as follows:

The device and the associated missiles are normally in the stowed position shown in Figs. 1 and 2 and the armament bay doors are closed. When it is desired to launch the missiles, the armament bay doors are opened by conventional means and motors 36 and 77 are actuated in the proper sequence and direction whereby frame 20 is lowered by motor 77 and chains 57 and 58 are actuated in the direction of arrows B in Fig. 2 such that when the rack is fully extended the vertical velocity of the missiles will cause them to be released from the rack at proper time intervals. As each missile becomes disengaged from the associated retaining members, it is allowed to fall free under the influence of gravity for approximately 0.1 second and then fired by remote control to insure that the missile clears the rack structure. As soon as the last missile is launched, the device is retracted by reversing motor 77 and the armament bay doors are closed.

The device may be rapidly rearmed when the aircraft is on the ground by opening the armament bay doors and extending the rack by actuating motor 77. The missiles may be mounted on chains 57 and 58 by selectively actuating motor 36 in the reverse direction. When the missiles are mounted in place on the chains, the rack is retracted by actuating motor 77 in the reverse direction and the armament bay doors are closed.

From the foregoing, it is apparent that there is provided a new and novel missile launcher device which is adapted to be housed within the body of an aircraft and which may be selectively extended into firing position during flight to permit the launching of a plurality of missiles in rapid succession by remotely controlled means. The device is light and simple in construction, yet sturdy and reliable in operation.

Obviously many modifications and variations of the present invention are possible in the light of the above teachings. It is therefore to be understood that within the scope of the appended claims the invention may be practiced otherwise than as specifically described.

I claim:

1. Apparatus for successively launching elongated missiles of the rocket type which comprises oppositely disposed guide means, a supporting frame for said missiles retractably mounted on said guide means, three pairs of sprockets rotatably mounted on each side of said supporting frame, a pair of endless chains each carried on opposite sides of said supporting frame by each of said three pairs of sprockets for concurrent movement in spaced-apart parallel planes, said three pairs of sprockets being disposed so that the first of said pairs lies intermediate the second and third of said pairs but in proximity to said second pair, with said endless chain being arranged to engage in succession both sprockets of said second pair, one sprocket of said third pair, both sprockets of said first pair, and then the remaining sprocket of said third pair, thus defining a chain configuration having two portions which extend essentially linearly and parallel to one another between said first and third pairs of sprockets and which move in the same direction upon actuation of said chain, and a plurality of retaining elements formed on each endless chain of said pair, with those retaining elements on the said chain portions which extend essentially linearly and parallel to one another and which move in the same direction being oppositely-disposed to thereby releasably support and position a missile between said chains so that the longitudinal axis of the missile is parallel to the planes defined by said endless chains, each missile being supported and positioned by two of the retaining elements formed on each endless chain of said pair.

2. Apparatus in accordance with claim 1, in which said supporting frame is channeled in the direction of movement of the retaining elements which support said missiles prior to release, each retaining element being disposed at least in part within a channel during such movement.

(References on following page)

References Cited in the file of this patent

UNITED STATES PATENTS

| | | |
|---|---|---|
| 2,250,240 | Steuerlein | July 22, 1941 |
| 2,374,885 | Nichols | May 1, 1945 |
| 2,440,723 | MacDonald | May 4, 1948 |
| 2,451,745 | Jolly | Oct. 19, 1948 |

FOREIGN PATENTS

| | | |
|---|---|---|
| 17,998 | Poland | May 6, 1933 |
| 18,872 | Poland | July 2, 1933 |
| 561,646 | Great Britain | May 30, 1944 |
| 1,007,106 | France | Feb. 6, 1952 |